United States Patent [19]

Ollivier

[11] Patent Number: 5,230,359
[45] Date of Patent: Jul. 27, 1993

[54] SUPPLY PRESSURE COMPENSATED FLUID PRESSURE REGULATOR AND METHOD

[75] Inventor: Louis A. Ollivier, Palo Alto, Calif.

[73] Assignee: Veriflo Corporation, Richmond, Calif.

[21] Appl. No.: 898,337

[22] Filed: Jun. 15, 1992

[51] Int. Cl.⁵ ............................................. G05D 16/02
[52] U.S. Cl. ................................ 137/14; 137/505.15; 137/505.39
[58] Field of Search ............... 137/14, 505.13, 505.15, 137/505.42, 505.41, 505.43, 505.39

[56] References Cited

U.S. PATENT DOCUMENTS 3,276,470 10/1966 Griffing ......................... 137/505.15
5,065,788 11/1991 McManigal et al. ...... 137/505.42 X

FOREIGN PATENT DOCUMENTS 1106137 5/1961 Fed. Rep. of Germany ........................ 137/505.42

Primary Examiner—Stephen M. Hepperle
Attorney, Agent, or Firm—Antonelli, Terry, Stout & Kraus

[57] ABSTRACT

A fluid pressure regulator and method of regulating high pressure fluid from a container such as high pressure gas cylinder, compensate for variation in the supply pressure to the regulator to limit variation in the outlet pressure of the regulator due to supply pressure variations. A flexible valve seat of the regulator is mounted in the regulator so that the seat can flex in response to changes in the supply pressure to change the operating point of the valve seat concurrently with changes in the balance of forces on a diaphragm of the regulator caused by changes in the supply pressure to the regulator. Advantageously, the regulator and method eliminate the need for using two stage regulators for minimizing outlet pressure variations due to the supply pressure effect.

19 Claims, 4 Drawing Sheets

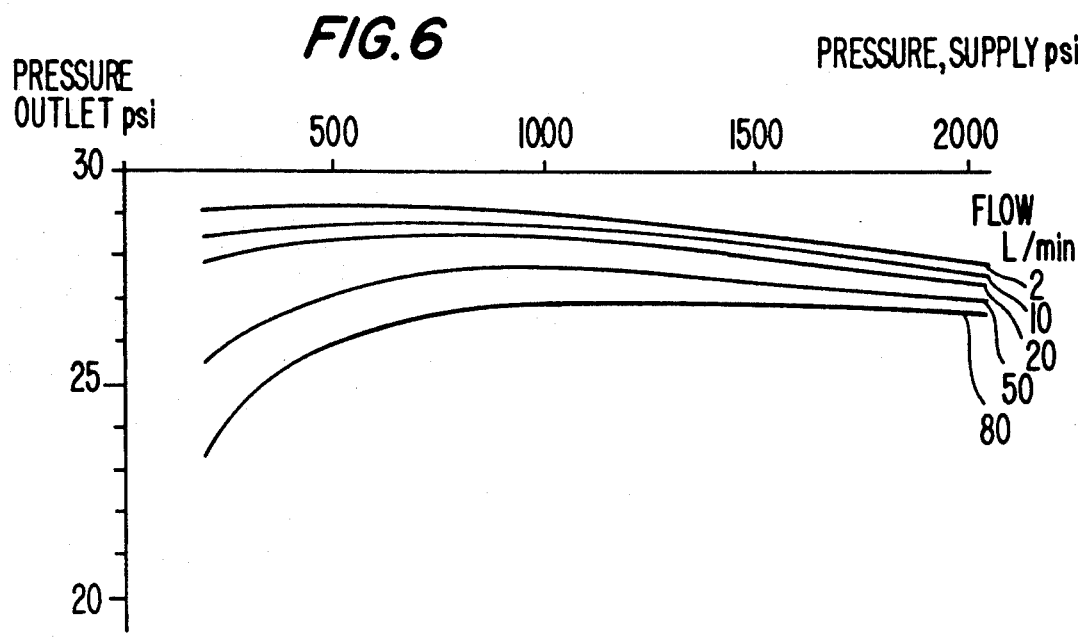
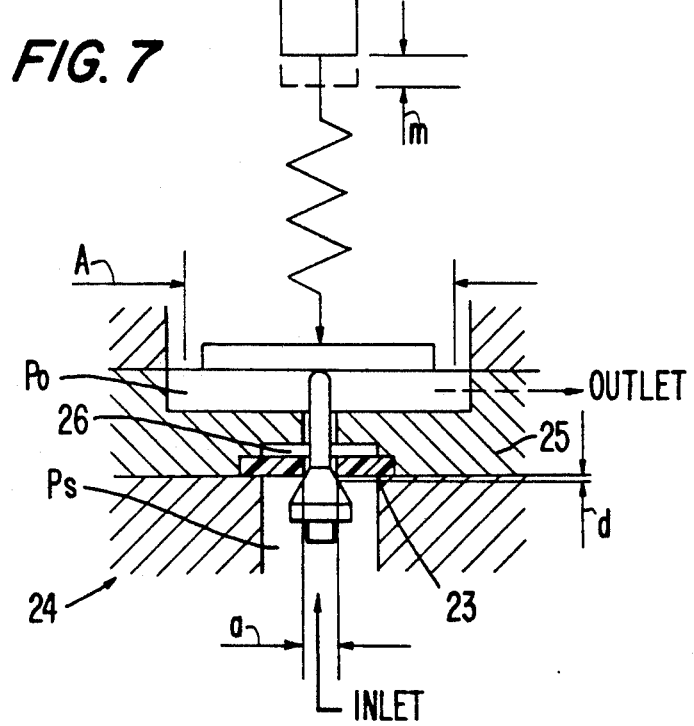

SUPPLY PRESSURE COMPENSATED FLUID PRESSURE REGULATOR AND METHOD

TECHNICAL FIELD

The present invention relates to a fluid pressure regulator and method for regulating the pressure and flow of fluid from a source of high pressure fluid such as a compressed gas cylinder containing gas at a pressure of 2,000 psi or greater when the cylinder is filled.

BACKGROUND ART

It is desired that fluid pressure regulators coupled to compressed gas cylinders or other containers containing pressurized gas at 2,000 psi or greater produce a constant outlet pressure as the gas in the cylinder is used up and the cylinder pressure decreases. For example, constant outlet pressures for pressurized nitrogen, nitrogen-arsine/phosphorous gas mixtures as dopants, argon, hydrogen and air, are desired in the manufacture and treatment of semiconductors. However, in typical known single stage fluid pressure regulators the outlet pressure increases by 9 psi as the cylinder pressure decreases from 2,000 psi down to 200 psi. A variation in outlet pressure of 9 psi is relatively substantial in relation to the typical outlet pressure of the regulator, which may be in the range of 25 to 35 psi. This is a problem where process requirements as in semiconductor manufacture call for constant or substantially constant gas pressure.

A prior art, single stage fluid pressure regulator 1 is schematically illustrated in FIG. 1 of the drawings. The pressure regulator 1 is shown connected at its inlet to a source of gas at high pressure, particularly a gas cylinder 2 which initially, when filled, contains a gas at a pressure of 2,000 psi or higher. The function of the regulator is to receive pressured gas from the cylinder at the regulator inlet, which is connected to the cylinder, and to deliver the gas at a selected lower pressure from the outlet of the regulator while minimizing the change in outlet pressure in the presence of changes in outlet flow and variations in supply pressure.

The regulator 1 comprises a diaphragm 3 and a valve 4. One end of the valve, the upper end in FIG. 1, contacts the diaphragm and the other, outwardly tapered end of the valve, cooperates with valve seat 5 for adjustably throttling a fluid passage 6 extending through the regulator. Particularly, the fluid passage 6 extends through central aperture 7 of the valve seat 5. The upper surface of the annular valve seat 5 is supported about the aperture 7 by regulator member 8. The lower, conical portion 9 of the valve 4 cooperates with the lower edge 10 of the seat about central aperture 7 for adjustably throttling the fluid passage through the regulator and thereby controlling the outlet pressure from the regulator. A spring 11 applies an adjustable force to the diaphragm 3.

The pressure regulator 1 operates on a force balance principle. The diaphragm 3 has an effective area A. The upper side of the diaphragm 3 is exposed to atmospheric pressure and has force $F_s$ applied thereto by the spring 11. The force $F_s$ is balanced by the force $F_{P_o}$ created by the outlet pressure $P_o$, that is the fluid pressure downstream of the throttled aperture 7 in valve seat 5, which acts on the diaphragm and a force $F_{P_s}$ created by the supply pressure $P_s$, that is the fluid pressure from the gas cylinder 2 in the regulator 1 upstream of the throttled aperture 7 of valve seat 5, acting against the valve 4 on an area a determined by the size of the aperture 7.

Any imbalance will result in a deflection of the diaphragm 3 to vary the size of the flow passage between the valve seat and the lower, conical portion 9 of the valve, that is to vary the amount of throttling of fluid passage 6 through the regulator 1, and thereby create a new value of $P_O$ in order to restore the balance. If there is an increase in outlet flow, $P_O$ starts to decrease. This increases the size of the adjustable passage between valve and valve seat 5 to supply a greater flow. Thus, a small decrease in outlet pressure provides the larger flow demand. If there is a decrease in the supply pressure (pressure decay at the supply cylinder as a result of usage), the force imbalance tends to increase the size of opening between the valve seat 5 and valve 4 which increases $P_O$ and restores the balance. Thus, a decrease in supply pressure increases the outlet pressure, for the same flow demand.

An equation defining the operation may be expressed as follows:

$$F_s = F_{P_o} + f_{P_s}, \text{ or,}$$

$$F_s = P_o A + (P_s - P_o)a,$$

or solving for the outlet pressure $P_o$, $$P_0 = \frac{F_s}{A} - (P_s - P_0)\frac{a}{A}.$$

From the above analysis, it is seen that the effect of variations in the supply pressure on the outlet pressure $P_O$ are a function of the expression $$(P_s - P_0)\frac{a}{A}.$$

In a typical prior art regulator of type illustrated in FIG. 1, $$\frac{a}{A} \text{ is } \frac{1}{200},$$

resulting in in a supply pressure effect of +0.5 psi per 100 psi decrease in the supply pressure $P_s$.

The motion of the valve $\Delta d$ to change the flow is defined by the equation $$\Delta d = \frac{\Delta P_o A}{K},$$

where K is the spring constant, lb/inch, of the system ($K_s$ for the spring $+K_D$ for the diaphragm). As the flow is increased, an increase, $\Delta d$, in the valve opening is required to provide the additional flow. This is accompanied by a decrease in outlet pressure $P_O$.

FIG. 2 illustrates flow curves for the conventional regulator 1 which show outlet pressure $P_O$ as a function of the flow rate for different values of supply pressure $P_s$. FIG. 3 shows the effect of supply pressure change for regulator 1 with a typical supply pressure effect of 0.5 psi per 100 psi. The slope of the basic supply pressure effect, shown as a dotted line, is modified by the corresponding flow curve as an increase in the supply pressure decreases the pressure drop for a given flow and only partially recovers the decrease created by the supply pressure effect. Thus, this conventional, single stage regulator 1 is undesirable for fluid pressure regulation where a constant or substantially constant outlet pressure for a given flow rate is necessary as the pressure in the gas cylinder decreases from 2,000 psi to, for example, 200 psi. From FIG. 3, for example, with a flow rate of 50 liters per minute, it is seen that at 2,000 psi the outlet pressure is between 17 and 18 psi whereas at 500 psi the outlet pressure has increased to between 23 and 24 psi, an increase of approximately 8 psi or almost 50%.

One prior art solution to this problem is the two stage fluid pressure regulator. The first stage of the regulator reduces the high pressure from the supply to an intermediate pressure, for example 400 psi, and a second stage of the regulator further reduces the pressure to a substantially constant outlet pressure. However, two stage regulators are disadvantageous in that they are relatively costly and heavy. There is a need for an improved fluid pressure regulator which can overcome the problem of the supply pressure effect in an efficient, cost effective manner for providing a constant or substantially constant outlet pressure even with wide changes in supply pressure.

DISCLOSURE OF INVENTION

An object of the present invention is to provide an improved fluid pressure regulator and method which overcome the aforementioned disadvantages with the conventional fluid pressure regulators. More particularly, an object of the invention is to provide an improved fluid pressure regulator and method of regulating the flow of fluid from a high pressure supply such as a gas cylinder which enable the outlet pressure of the regulator to be relatively constant without necessitating the use of a two stage regulator and without substantially increasing the cost of the regulator as compared with the conventional single stage regulator.

These and other objects are attained by the fluid pressure regulator of the invention which comprises a fluid passage for the flow of pressurized fluid, a valve movably positioned in the regulator for adjustably throttling the fluid passage and the flow of pressurized fluid therethrough and a diaphragm which can be deflected in response to a force imbalance thereon for moving the valve. A spring applies a first force on the diaphragm in a first direction. Pressurized fluid downstream of the throttled passage in the regulator applies a second force on the diaphragm in a second direction opposite the first direction. A third force is applied to the diaphragm in the second direction by way of the valve as a function of the pressure of the fluid supplied to the throttled passage in the regulator which acts on the valve.

The regulator further includes means for substantially reducing the rate of change of the amount of throttling of the fluid passage by the valve with a given movement of the valve and diaphragm in response to a force imbalance on the diaphragm caused by a change in the pressure of fluid supplied to the throttled passage, as compared with the rate of change of the throttling amount with said given movement of the diaphragm and valve caused by a change in the pressure of the fluid downstream of the throttled passage.

According to the disclosed, preferred embodiments of the invention, the means for substantially reducing the rate of change of the amount of the throttling of the fluid passage includes a valve seat having an aperture extending therethrough which defines a portion of the fluid passage. The valve cooperates with the valve seat about the aperture therein for adjustably throttling the fluid passage. The valve seat is mounted in the regulator for movement in response to changes in the pressure of the fluid supplied to the throttled passage to offset, at least to a substantial extent, the supply pressure effect.

The fluid pressure regulator, according to the disclosed embodiments further comprises means for fixedly supporting the valve seat in the fluid pressure regulator only at a location spaced radially outwardly of the seat aperture such that a radially inner portion of the seat in the immediate vicinity of the aperture can be deflected in response to changes in the pressure of fluid supplied to the throttled passage. Particularly, in the disclosed embodiments, the radially inner portion of the seat not fixedly supported extends over at least one-half and preferably at least two-thirds of the diameter of the annular seat as seen in a cross-section of the seat taken along a longitudinal central axis of the seat aperture.

In one embodiment, the radially inner portion of the seat in the immediate vicinity of the aperture is yieldably supported by a spring to control deflection of the seat in response to changes in the pressure of the fluid supplied to the throttled passage. According to another embodiment of the invention, the seat is formed of a resilient material and dimensioned such that the resilience of the seat itself is relied upon for controlling the degree of deflection thereof in response to changes in the pressure of fluid supplied to the throttled passage. An underlying support member is spaced from the seat a predetermined distance for limiting the maximum deflection amount of the radially inner portion of the seat in response to pressure of the fluid supplied to the throttled passage which acts on the seat.

The method of the invention for regulating the fluid flow and pressure from a container of pressurized fluid, such as a high pressure gas cylinder, using a fluid pressure regulator as described herein comprises moving the valve seat in the regulator in response to changes in the pressure of the fluid supplied to the throttled passage of the regulator from the pressurized fluid container to substantially reduce changes in the pressure of fluid downstream of the throttled passage with movement of the diaphragm and valve of the regulator as a result of force imbalances on the diaphragm caused by changes in the pressure in the container. This movement of the valve seat is caused by the application of the fluid pressure of the fluid supplied to the throttled passage on the valve seat. This movement occurs because, in the illustrated embodiments, the valve seat is fixedly supported only at its outer peripheral portion and the radially inner portion of the valve seat about the aperture therethrough resiliently moves a predetermined, controlled amount as a function of the pressure of the fluid acting thereon.

Figure 4:
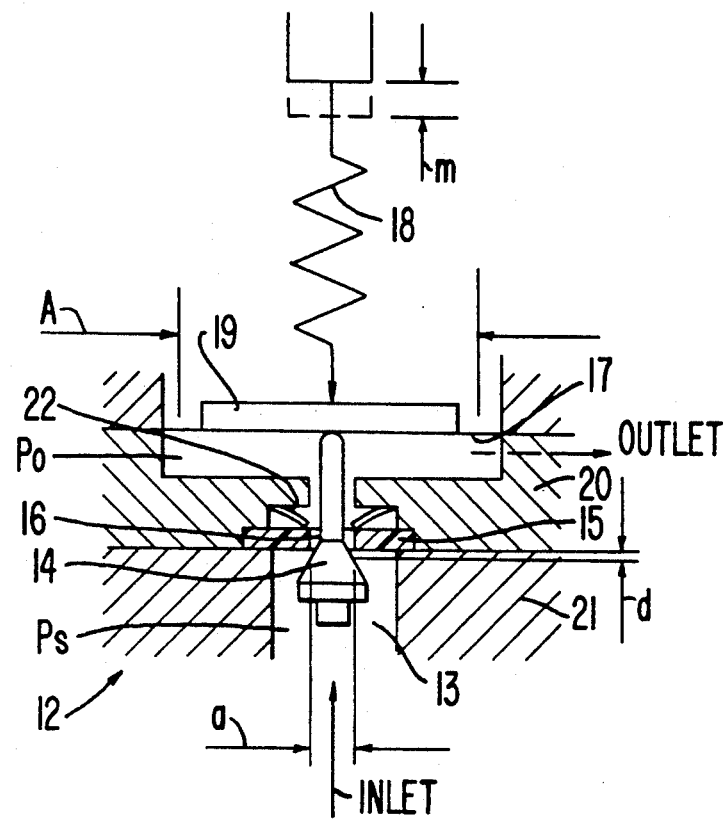
Figure 5:
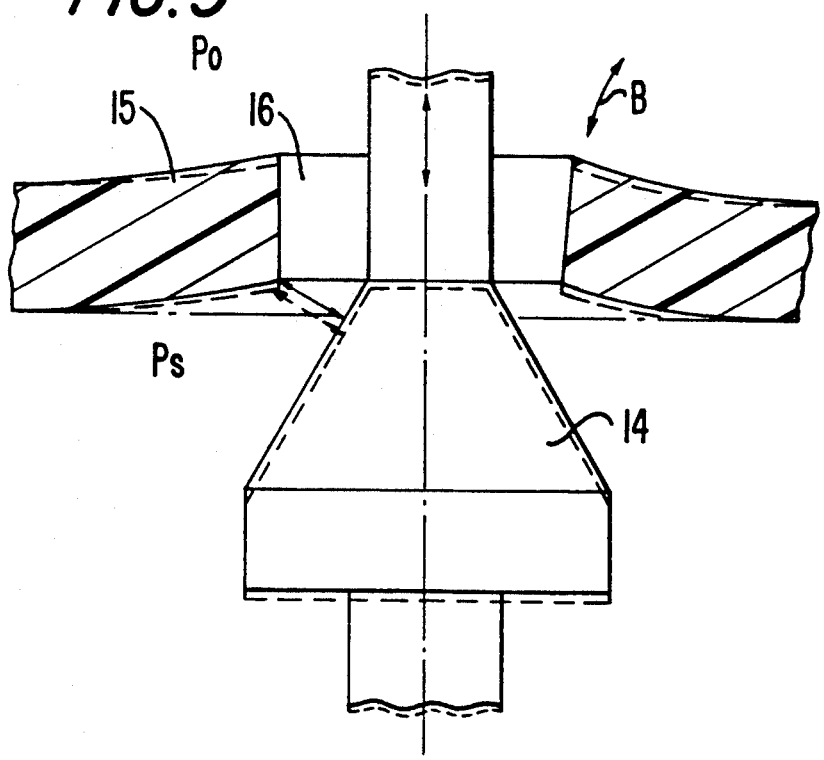

FIG. 4 is a schematic illustration, partially in cross-section of a fluid pressure regulator according to a first embodiment of the invention;

FIG. 5 is an enlarged view of a portion of the regulator of FIG. 4 illustrating an inner portion of the valve seat which is moved in the direction of arrow B from the plane of the outer portion of the valve seat as a function of changes in the supply pressure acting on the valve seat;

FIG. 6 is a graph illustrating the flow characteristics of the regulator of FIGS. 4 and 5 wherein outlet pressure is shown as a function of supply pressure for each of the outlet flow rates from the regulator of 2, 10, 20, 50 and 80 liters per minute; and FIG. 7 is a schematic illustration, partially in cross-section, of a fluid pressure regulator according to a second embodiment of the invention.

BEST MODE FOR CARRYING OUT THE INVENTION

The fluid pressure regulator 12 according to a first embodiment of the invention as depicted in FIG. 4 comprises a fluid passage 13 which extends through the regulator between an inlet and outlet of the regulator. The regulator is adapted to be used in combination with a supply of pressurized fluid, such as a pressurized gas cylinder like that shown in FIG. 1. For this purpose, a threaded fitting, not shown, is provided on the regulator about the inlet of fluid passage 13 for threaded attachment of the regulator to the gas pressure cylinder.

A valve 14 is movably positioned in the regulator for adjustably throttling the fluid passage 13 at a valve seat 15 about an aperture 16 extending therethrough. The aperture 16 forms part of the fluid passage 13 through the regulator. A diaphragm 17, illustratively formed of 316 stainless steel of a thickness such that it is flexible, is located in the regulator. The diaphragm is deflected in response to a force imbalance thereon for moving the valve. The upper end of the valve contacts the lower surface of the diaphragm as shown in FIG. 4.

A spring 18 applies a first force on the diaphragm 17 in a first, downward direction as shown in FIG. 4. The spring force is applied to the diaphragm by way of pressure plate 19 in the same manner as in the conventional regulator of FIG. 1. Pressurized fluid downstream of the throttled passage between valve seat 15 and valve 14 applies a second force on the diaphragm in a second direction opposite the first direction. A third force is applied to the diaphragm by way of the valve 14. The third force is a function of the pressure of the fluid supplied to the throttled passage which acts on the valve. Thus, like the prior art regulator 1 in FIG. 1, the regulator 12 according to the invention operates on a force balance principle where the force $F_s$ applied by the spring is balanced by the force $F_{P_O}$ created by the outlet pressure $P_O$ on the diaphragm and the force $f_{P_s}$ created by the supply pressure against the valve on an area determined by the size of the aperture 16 through the valve seat. Any imbalance will result in a deflection of the diaphragm and movement of the valve 14 to restore the balance as discussed previously.

The valve seat 15 in the regulator 12 is clamped between first and second members 20 and 21 of the regulator 12 for fixedly supporting the valve seat only at a location spaced radially outwardly of the seat aperture 16 such that a radially inner portion of the seat in the immediate vicinity of the aperture will be adjustably deflected, by the fluid pressure thereon, an amount dependent on the supply pressure. For this purpose, the valve seat is preferably formed of flexible, resilient material to permit its deflection at the radially inner portion of the seat in response to changes in the pressure fluid supplied to the throttled passage.

The valve seat 15 in the disclosed embodiment is formed of KEL-F, a polymer of chlorotrifluoroethylene, but other materials could be employed. The outer diameter of the annular valve seat 15 is 0.375 inch and its thickness is 0.050 inch. The diameter a of the aperture 16 in the valve seat is 0.062 inch. The poppet valve 14 of regulator 12 is formed of 316 stainless steel as is the diaphragm 17. The effective area of the annular diaphragm is 1.0 inch$^2$. The first and second members 20 and 21 clamp and fixedly support only the outer one-third of the valve seat 15 with the radially inner portion of the valve seat, 0.25 inch in diameter, being free to move upwardly and back as shown in FIGS. 4 and 5 in response to changes in the pressure $P_O$ of the fluid supplied to the throttled passage thus changing the operating point of the seat.

In the embodiment of FIG. 4, the radially inner portion of the seat is yieldably supported by a Belleville spring 22 for controlling deflection of the valve seat in response to changes in pressure of the fluid supplied to the throttled passage. The Belleville spring 22 is formed of Elgiloy metal having a thickness of 0.006 inch and has a spring constant such that the valve seat and spring move 0.006 inch for a change in supply pressure $P_s$ of 1,000 psi. The spring contacts and is located in a recess between the upper surface of the valve seat 15 about the aperture 16 therein, and the upper side of first member 20. The deflection or movement of the radially inner portion of the valve seat upwardly and back with respect to the plane of the annular seat in response to changes in supply pressure $P_s$ is illustrated more clearly in FIG. 5, see arrow B.

Figure 1:
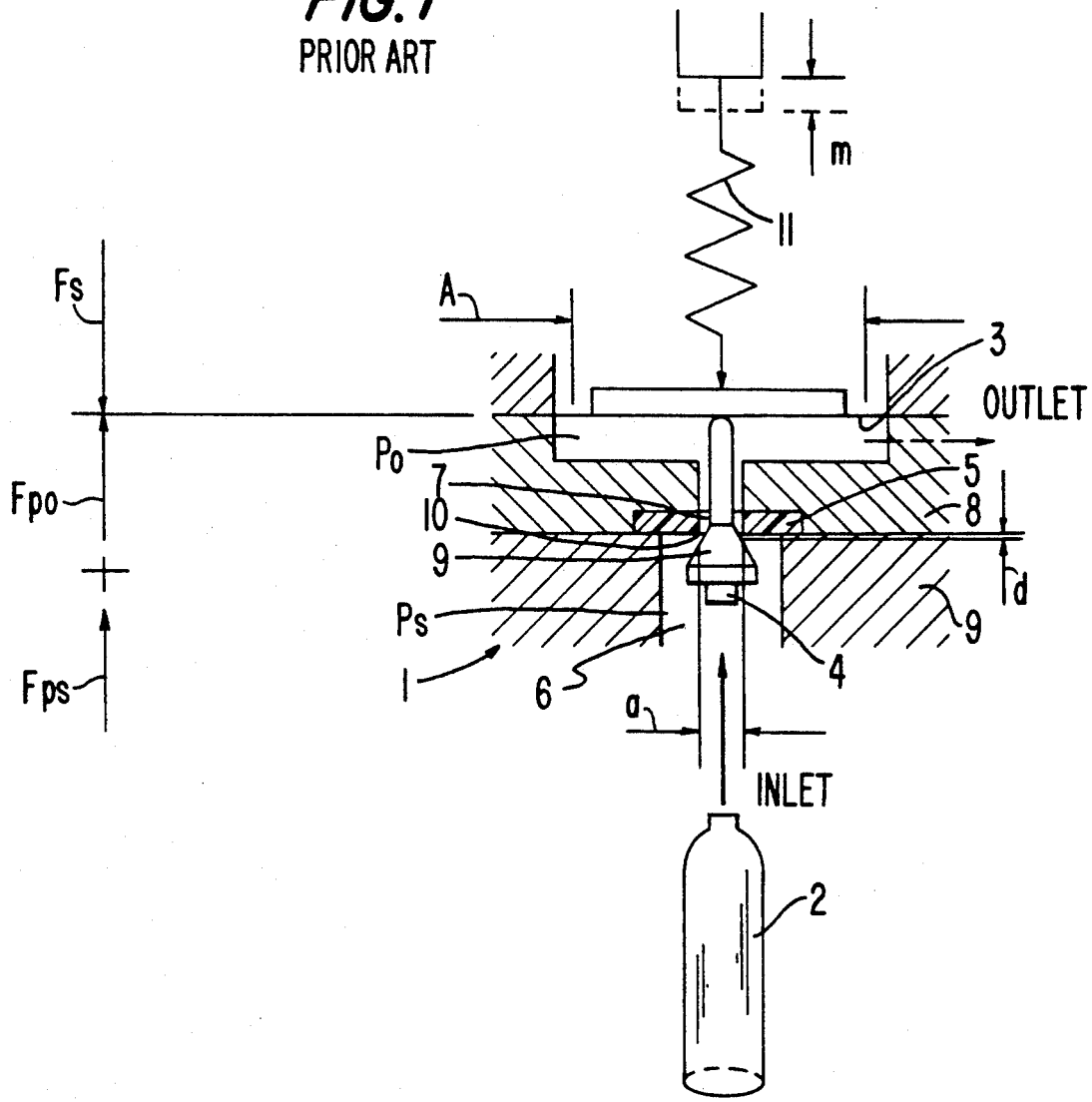
FIG. 1 is a schematic illustration of a prior art regulator connected to a high pressure gas cylinder for regulating the flow of gas from the cylinder.
Figure 2:
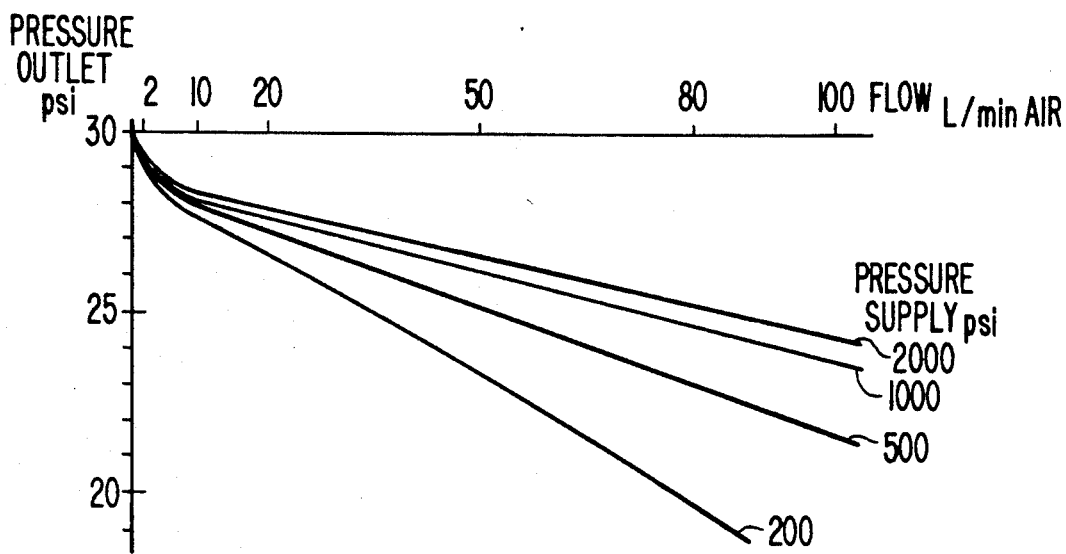
FIG. 2 is a characteristic of a prior art regulator of FIG. 1 showing the outlet pressure of the regulator as a function of the outlet flow from the regulator in the case of a supply pressure of 2,000 psi, of 1,000 psi, and of 500 psi and of 200 psi at the inlet of the regulator.
Figure 3:
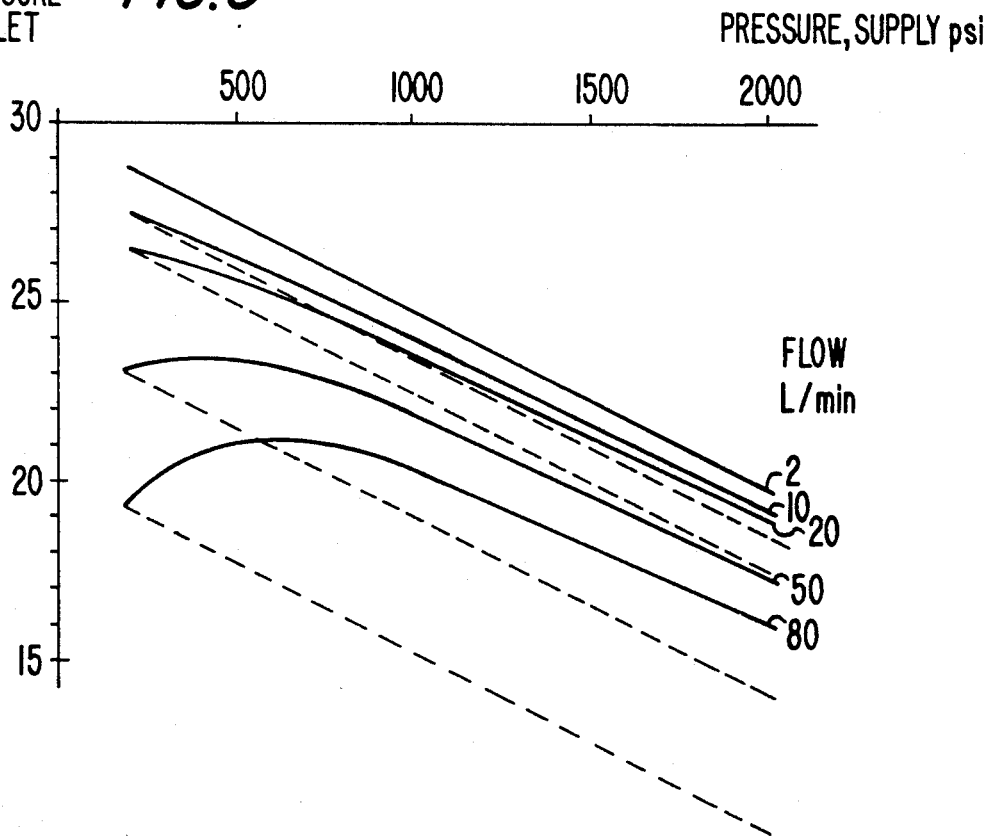
FIG. 3 is a graph illustrating the effect of supply pressure changes for the prior art regulator of FIG. 1 with a typical supply pressure effect of 0.5 psi per 100 psi for each of the flow rates of 2, 10, 20, 50 and 80 liters per minute.

As referred to above with respect to the conventional regulator of FIG. 1, with the regulator 12 according to the invention if there is an increase in outlet flow, $P_O$ starts to decrease. This increases the valve opening to supply a greater flow. Thus, a small decrease in outlet pressure provides the larger flow demand. If there is a decrease in the supply pressure (pressure decay at the supply cylinder as a result of usage), the force imbalance caused by a reduction in the force $F_{P_s}$ on the valve 14 causes the diaphragm 17 and valve 14 to move downwardly to restore the force balance on the diaphragm. In the prior art regulator of FIG. 1 this results in an increase in the size of the throttled passage between the valve seat and valve which, in turn, increases $P_O$, the outlet pressure downstream of the throttled passage thereby resulting in the undesired supply pressure effect referred to above. This problem is solved according to the present invention by mounting the valve seat 15 in the regulator for movement in response to changes in pressure $P_s$, of the fluid supplied to the throttled passage for changing the operating point of the valve seat whereby the effect of changes in pressure of fluids supplied to the throttled passage on the pressure $P_O$ of the fluid downstream of the throttled passage is substantially reduced.

The application of supply pressure $P_s$ to the valve seat 15 deflects the radially inner portion of the valve seat about the aperture 16 upwardly against the bias of spring 22 a distance which is a function of the pressure $P_s$ and the spring constant of the valve seat-spring assembly. With a drop in the supply pressure $P_s$, as during usage of the gas from a gas pressure cylinder, the upward force on the valve 14 caused by the supply pressure $P_s$ is reduced causing a force imbalance on the diaphragm 17. To restore the balance, the diaphragm and valve move downwardly, see the position indicated in dashed lines of FIG. 5, in order to restore the force balance on the diaphragm. For a fixed point of operation of the valve seat 15, this would cause an increase in the size of the throttle fluid passage thereby increasing the outlet pressure $P_O$. However, according to the invention the drop in supply pressure $P_s$ also results in a downward movement of the radially inner portion of the valve seat 15. This downward movement offsets or at least substantially reduces the change in the amount of throttling of the fluid passage by the valve with a downward movement of the valve and diaphragm in response to the force imbalance on the diaphragm. Accordingly, the supply pressure effect of the regulator is compensated for in the regulator 12 according to the present invention.

FIG. 6 illustrates the results attained with the pressure regulator 12 according to the invention, the regulator having a basic supply pressure effect of 0.3 psi per 100 psi which is substantially compensated for by the aforementioned construction. As seen from FIG. 6, the outlet pressure stays within 1 psi of its setting as the supply pressure changes from 2,000 psi down to 200 psi for flows up to 20 liters per minute and down to 400 psi for flows up to 50 liters per minute.

In the fluid pressure regulator of the embodiment shown in FIGS. 4 and 5, the spring 22 cooperates with the valve seat 15 to create a change in the valve seat operating point to cancel or reduce substantially the effect of the supply pressure effect on outlet pressure. However, according to the embodiment in FIG. 7 of the application drawings, no additional spring is employed. The radially inner portion of the valve seat is unsupported as the material and dimensions of the valve seat are selected so that the valve seat itself has the necessary resilient spring characteristic for controlling seat deflection as a result of changes in the supply pressure $P_s$. As another feature of the invention, the surface 26 of member 25 of the regulator is preferably spaced from the undeflected, radially inner portion of the valve seat 23 a predetermined distance, 0.010 inch, to limit the ultimate permissible movement in response to increased supply pressure $P_s$.

From the above, it can be seen that the method of regulating the fluid pressure dispensed from a container of pressurized fluid according to the invention, in a fluid pressure regulator of the aforementioned type, comprises moving the valve seat in response to changes in the pressure of the fluid supplied to the throttled passage of the regulator from the pressurized fluid container to substantially reduce changes in the pressure of the fluid downstream of the throttled passage with movement of the diaphragm and valve as a result of force imbalances on the diaphragm caused by changes in the pressure in the container. The movement of the valve seat is caused by the deflection of a portion of the seat in response to application of the fluid pressure $P_s$ of the fluid supplied to the throttled passage on the valve seat. In this way, the fluid pressure regulator and method of the invention advantageously permit substantial reduction of the supply pressure effect on the outlet pressure as compared with conventional single stage fluid pressure regulators, without necessitating the use of multiple stage regulators.

While I have shown and described only two embodiments in accordance with the present invention, it is understood that the same is not limited thereto, but is susceptible to numerous changes and modifications as known to those skilled in the art. Therefore, I do not wish to be limited to the details shown and described herein, but intend to cover all such changes and modifications as are encompassed by the scope of the appended claims.

I claim:

1. A fluid pressure regulator comprising:
   a fluid passage for the flow of pressurized fluid;
   a valve movably positioned in said regulator for adjustably throttling said fluid passage and the flow of pressurized fluid therethrough;
   a diaphragm which can be deflected in response to a force imbalance thereon for moving said valve;
   a spring for applying a first force on the diaphragm in a first direction, pressurized fluid downstream of said throttled passage applying a second force on the diaphragm in a second direction opposite said first direction, a third force being applied to said diaphragm in said second direction by way of said valve, said third force being a function of the pressure of said fluid supplied to said throttled passage which acts on said valve; and
   means for substantially reducing the rate of change of the amount of throttling of the fluid passage by the valve with a given movement of the valve and diaphragm in response to a force imbalance on the diaphragm caused by a change in the pressure of fluid supplied to said throttled passage which acts on said valve as said third force, as compared with the rate of change of the throttling amount with said given movement of the diaphragm and valve caused by a change in the pressure of the fluid downstream of said throttled passage which applies said second force on the diaphragm, wherein said means for substantially reducing the rate of change of the amount of the throttling of the fluid passage includes a flexible valve seat having an aperture extending therethrough which defines a portion of said fluid passage, said valve cooperating with said flexible valve seat about the aperture therein for adjustably throttling said fluid passage, and wherein said flexible valve seat is mounted in said regulator for flexural movement of the valve seat in response to changes in the pressure of the fluid supplied to said throttle passage.

2. The fluid pressure regulator according to claim 1, further comprising means for fixedly supporting said seat in the fluid pressure regulator only at a location spaced radially outwardly of said seat aperture such that a radially inner portion of said seat in the immediate vicinity of said aperture can be deflected by flexure of the seat in response to changes in the pressure of fluid supplied to the throttled passage.

3. The fluid pressure regulator according to claim 2, wherein said seat is annular and the radially inner portion of said seat extends over at least on-half of the diameter of said seat as seen in a cross-section of the seat taken along a longitudinal central axis of said seat aperture.

4. The fluid pressure regulator according to claim 3, wherein said radially inner portion extends over at least two-thirds of said diameter of the seat.

5. The fluid regulator according to claim 2, wherein said flexible valve seat is formed of a resilient material for controlling the degree of deflection thereof in response to changes in the pressure of the fluid supplied to the throttled passage.

6. The fluid pressure regulator according to claim 5, wherein said radially inner portion of said seat in the immediate vicinity of said aperture is unsupported.

7. The fluid pressure regulator according to claim 2, wherein the radially inner portion of the seat is yieldably supported by a spring to control flexural deflection of the seat in response to changes in the pressure of the fluid supplied to the throttled passage.

8. The fluid pressure regulator according to claim 2, further comprising a spring which yieldably supports said valve seat for controlling the flexural movement thereof in response to changes in the pressure of the fluid supplied to said throttle passage.

9. A fluid pressure regulator comprising:
a fluid passage for the flow of pressurized fluid;
a valve movably positioned in said regulator for adjustably throttling said fluid passage and the flow of pressurized fluid thereto;
a diaphragm which can be deflected in response to a force imbalance thereon for moving said valve;
a spring for applying a first force on the diaphragm in a first direction, pressurized fluid downstream of said throttled passage applying a second force on the diaphragm in a second direction opposite said first direction, a third force being applied to said diaphragm in said second direction by way of said valve, said third force being a function of the pressure of the fluid supplied to said throttled passage which acts on said valve; and
a flexible valve seat having an aperture extending therethrough which defines a portion of said fluid passage, said valve cooperating with said valve seat about its aperture for adjustably throttling said fluid passage, wherein said valve seat is mounted in said regulator for flexural movement of the valve seat in response to changes in the pressure of the fluid supplied to said throttled passage for changing the operating point of said seat whereby the effect of changes in the pressure of fluid supplied to said throttled passage on the pressure of the fluid downstream of said throttled passage caused by a change in the force balance on said diaphragm is substantially reduced.

10. The fluid pressure regulator according to claim 9, further comprising means for fixedly supporting said seat in the regulator only at a location spaced radially outwardly of said seat aperture such that a radially inner portion of said seat in the immediate vicinity of said aperture can be deflected by flexure of the seat in response to changes in the pressure of the fluid supplied to the throttled passage.

11. The fluid pressure regulator according to claim 10, wherein said seat is annular and the radially inner portion of said seat extends over at least one-half of the diameter of the seat as seen in a cross-section thereof taken along a central axis of said seat aperture.

12. The fluid pressure regulator according to claim 11, wherein the radially inner portion of the seat extends over at least two-thirds of said diameter of said seat.

13. The fluid pressure regulator according to claim 10, wherein said flexible valve seat is formed of a resilient material for controlling the degree of deflection thereof in response to changes in the pressure of fluid supplied to said throttled passage.

14. The fluid pressure regulator according to claim 13, wherein said radially inner portion of said seat is unsupported.

15. The fluid pressure regulator according to claim 10, wherein the radially inner portion of the seat is yieldably supported by a spring for controlling the flexural deflection of the seat in response to changes in the pressure of the fluid supplied to said throttled passage.

16. The fluid pressure regulator according to claim 10, including means for limiting the amount of flexural deflection of said radially inner portion of the seat in response to changes in the pressure of the fluid supplied to the throttle passage.

17. In the method of regulating the fluid pressure dispensed from a container of pressurized fluid, such as a high pressure gas cylinder, using a fluid pressure regulator having a fluid passage for the flow of pressurized fluid, a valve movably positioned in the regulator for adjustably throttling the fluid passage and the flow of pressurized fluid therethrough, a diaphragm which can be deflected in response to a force imbalance thereon for moving said valve, a spring for applying a first force on the diaphragm in a first direction, pressurized fluid downstream of said throttled passage applying a second force on the diaphragm in a second direction opposite said first direction, a third force being applied to said diaphragm in said second direction by way of said valve, said third force being a function of the pressure of said fluid supply to said throttled passage which acts on said valve and a valve seat having an aperture extending therethrough which defines a portion of said fluid passage, the valve cooperating with said valve seat about the aperture for adjustably throttling said fluid passage, the improvement comprising forming the valve seat of a flexible material and mounting the valve seat in the regulator for flexural movement of the valve seat in response to changes in the pressure of the fluid supplied to the throttled passage of the regulator from said pressurized fluid container which acts on the valve seat to substantially reduce changes in the pressure of fluid downstream of the throttled passage with movement of the diaphragm and valve as a result of force imbalances on the diaphragm caused by changes in the pressure in said container.

18. The fluid pressure regulator according to claim 1, wherein the flexible valve seat is made of a polymer.

19. The flow pressure regulator according to claim 9, wherein said flexible valve seat is made of a polymer.

* * * * *